(12) United States Patent
Mercurio et al.

(10) Patent No.: US 7,978,056 B2
(45) Date of Patent: Jul. 12, 2011

(54) SYSTEM FOR CUSTOMIZING LIGHTING AND SOUND EFFECTS IN A VEHICLE

(75) Inventors: Joseph F. Mercurio, Birmingham, MI (US); Michael H Thomas, Royal Oak, MI (US); In Woong Lee, Rochester Hills, MI (US); Marko Macura, Eindhoven (NL); Peter G. Matthews, Amsterdam (NL)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/131,169

(22) Filed: Jun. 2, 2008

(65) Prior Publication Data
US 2009/0024276 A1    Jan. 22, 2009

Related U.S. Application Data

(60) Provisional application No. 60/950,509, filed on Jul. 18, 2007.

(51) Int. Cl.
*B60Q 1/00* (2006.01)

(52) U.S. Cl. ................... 340/438; 340/426.14; 340/461; 701/36

(58) Field of Classification Search .................. 340/438, 340/426.14, 426.16, 825.22, 825.24, 825.25, 340/461, 465, 472, 458, 459; 701/36, 37, 701/45, 86, 108, 109
See application file for complete search history.

(56) References Cited

U.S. PATENT DOCUMENTS

| | | | |
|---|---|---|---|
| 6,147,761 A * | 11/2000 | Walowit et al. | 356/425 |
| 6,330,497 B1 * | 12/2001 | Obradovich et al. | 701/1 |
| 6,663,010 B2 * | 12/2003 | Chene et al. | 236/51 |
| 6,696,932 B2 | 2/2004 | Skibinski et al. | |
| 6,717,376 B2 | 4/2004 | Lys et al. | |
| 7,170,400 B2 | 1/2007 | Cowelchuk et al. | |
| 7,538,662 B2 * | 5/2009 | Allmendinger | 340/461 |
| 7,688,187 B2 * | 3/2010 | Caird et al. | 340/436 |
| 2003/0220722 A1 * | 11/2003 | Toba et al. | 701/1 |

* cited by examiner

*Primary Examiner* — Anh V La
(74) *Attorney, Agent, or Firm* — Quinn Law Group, PLLC

(57) ABSTRACT

A vehicle includes a passenger compartment, a touch-screen for receiving an input signal from an occupant when the occupant touches the touch-screen, an output device, and a controller. The controller changes a characteristic of an electromagnetic wave in the form of visible light and/or an audible sound, which is transmitted into the passenger compartment via the output device in response to the input signal. The output device includes light sources, such as light-emitting diodes (LED) or electro-luminescent (EL) ribbon and a speaker. The controller presents a predetermined set of lighting and/or sound options on the touch-screen which the occupant can touch to generate the input signal, thus selectively illuminating the light sources or playing a particular sound file. The controller can also play a digital sound file whenever a corresponding vehicle condition is detected.

4 Claims, 4 Drawing Sheets

SYSTEM FOR CUSTOMIZING LIGHTING AND SOUND EFFECTS IN A VEHICLE

CROSS-REFERENCE TO RELATED APPLICATIONS

This application claims the benefit of and priority to U.S. Provisional Applications Ser. No. 60/950,509 filed on Jul. 18, 2007 and which is hereby incorporated by reference in its entirety.

TECHNICAL FIELD

The present invention relates to a vehicle having a system for customizing lighting and sound effects transmitted within a vehicle interior or passenger compartment.

BACKGROUND OF THE INVENTION

Because people spend a substantial amount of time in their vehicles, whether commuting to and from work, traveling, or running errands, vehicle interiors or passenger compartments are commonly equipped with various features geared toward improving the overall comfort and enjoyment of vehicle occupants. However, other aspects of the driving experience, particularly as it relates to the synchronization and/or customization of lighting and sound effects within the passenger compartment, remain less than optimal due in part to the limited ability of an occupant to change these effects to suit his or her own unique mood, tastes, or preferences.

For example, lighting within a passenger compartment is generally limited to a fixed incandescent or fluorescent overhead bulb, and/or similar peripheral lighting devices positioned on the vehicle doors, handles, mirrors, etc. Instrument panel gauges are illuminated using soft ambient or background lighting, which can be selectively dimmed or turned on and off using a standard dimmer switch. Likewise, vehicle sound effects include a fixed tone, such as the typical "ding-ing" tone that is transmitted into the passenger compartment whenever a vehicle door is ajar or when an indicator or warning lamp is illuminated, or the "clicking" of an activated turn signal. However, these options tend to be standardized across a particular vehicle model or design, and generally offer few if any user-friendly customization options to the occupant.

SUMMARY OF THE INVENTION

Accordingly, a system is provided for use in a vehicle passenger compartment which allows a passenger or occupant of the vehicle to adjust a characteristic of an electromagnetic or EM wave which is transmitted into the passenger compartment of the vehicle in the form of either or both of a visible light wave and an audible sound wave. The occupant can associate a particular stored digital sound file and/or a particular lighting effect with a vehicle condition, such as a detected obstacle, an ajar door, etc. Likewise, the occupant can select a unique color and/or sound "theme" for transmission into the passenger compartment, regardless of the presence of the associated vehicle condition. These themes can include any combination of lighting and sound effects to the occupants liking. To enhance the user-friendliness of the system, a touch-screen or other user-friendly input device is used as an interface, with various icons being presented on the touch-screen. The occupant can select a particular theme or association by touching a corresponding icon.

In particular, a vehicle includes a body defining a passenger compartment, a display for receiving an input signal from an occupant of the passenger compartment when the occupant touches a touch-screen portion of the display, an output device, and a controller. The controller selectively changes a characteristic of an electromagnetic (EM) wave, such as a visible light wave and/or an audible sound wave, which is transmitted into the passenger compartment via the output device in response to the input signal.

The output device can include light sources, such as but not limited to a light-emitting diode (LED) device and an electro-luminescent (EL) light ribbon, positioned somewhere within the passenger compartment. In one embodiment, light sources are positioned on opposing sides of a center console, although other positions or locations within the passenger compartment are also usable within the scope of the invention. When used to control the lighting effect, the controller presents a predetermined set of lighting options or lighting icons on the touch-screen portion, which the occupant can touch to thereby generate the input signal, and in this manner selectively illuminate the light sources in a particular color or set of colors. The output device can also include an audio speaker, with the controller presenting a predetermined set of sound options or sound icons on the touch-screen portion which the occupant can touch to generate the input signal, and to thereby associate a predetermined sound file with a corresponding vehicle condition.

A system is also provided for customizing an EM wave which is transmitted by an output device within a passenger compartment of a vehicle. The system includes a touch-screen display positioned within the passenger compartment and operable for presenting a set of options for changing a characteristic of the EM wave, and for generating input signals activating the output device when an occupant of the passenger compartment touches an option on the touch-screen display. A controller processes the input signals to thereby change the characteristic of the EM wave.

DESCRIPTION OF THE PREFERRED EMBODIMENTS

Figure 1:
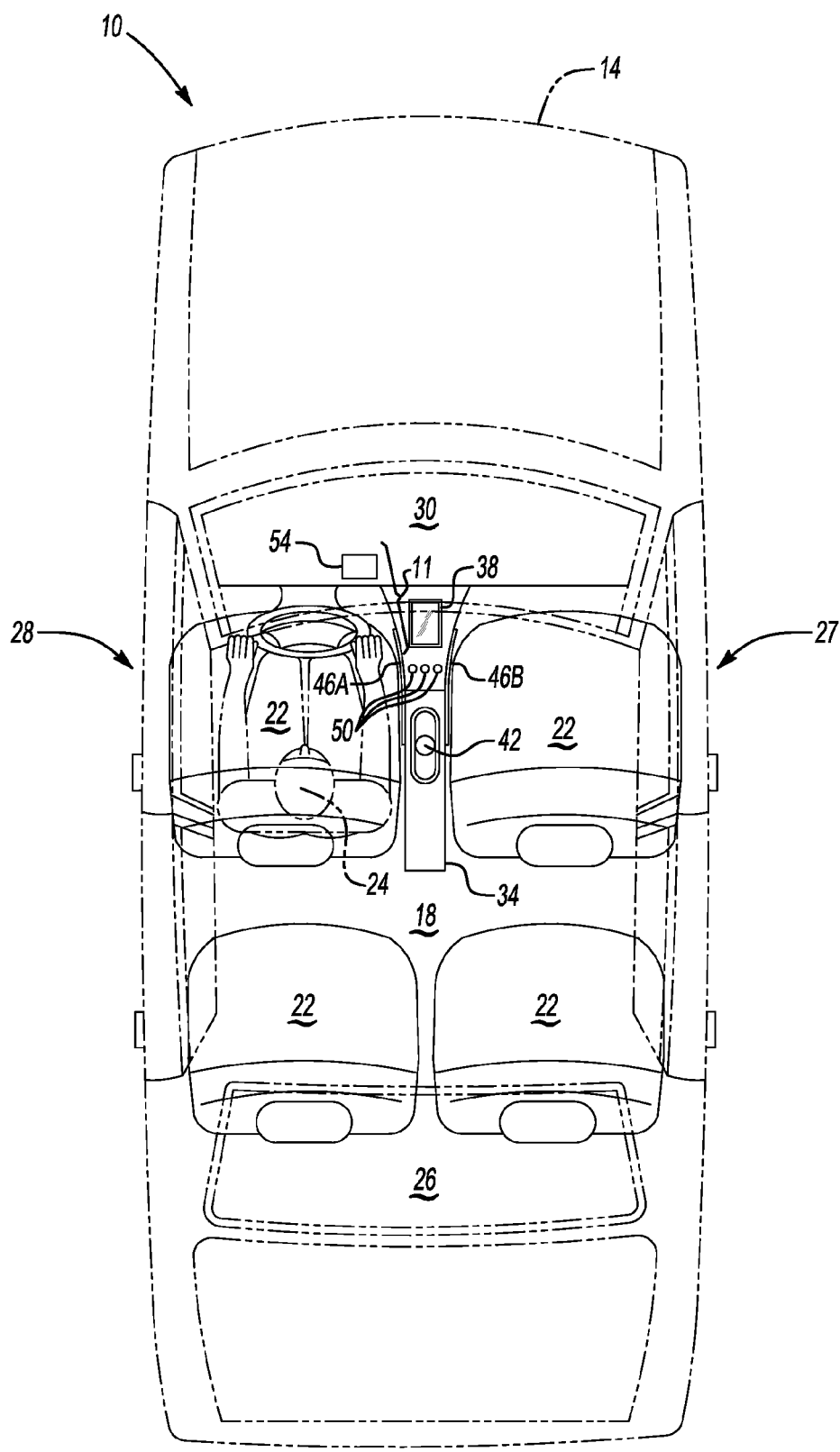
FIG. 1 is a schematic illustration of a vehicle having a lighting and sound customization system in accordance with the invention.

Referring to the drawings wherein like reference numbers represent like components throughout the several figures, and beginning with FIG. 1, a vehicle 10 includes a vehicle body 14 at least partially defining a vehicle interior or a passenger compartment 18. The vehicle 10 includes passenger seats 22 mounted to the floor 26 of the body 14 within the passenger compartment 18. The seats 22 face an instrument panel 30 mounted with respect to the vehicle body 14 within the passenger compartment 18. A center console 34 is mounted with respect to the vehicle body 14 and is disposed within the passenger compartment 18, with the center console 34 positioned adjacent to the instrument panel 30 and extending between two of the passenger seats 22.

A lighting and sound customization system 20, referred to hereinafter as the system 20 for simplicity, is connected to or formed integrally with the center console 34 or another convenient location within the passenger compartment 18. The system 20 includes a display 38 that is mounted to or within the console 34 such that the display 38 is visible and readily accessible to an occupant 24 of the passenger compartment 18. A transmission gear selector 42 can also be mounted to the console 34, with the selector 42 being selectively movable by the occupant 24 in order to select the operating mode, gear setting, or state of a vehicle transmission (not shown).

Figure 2:
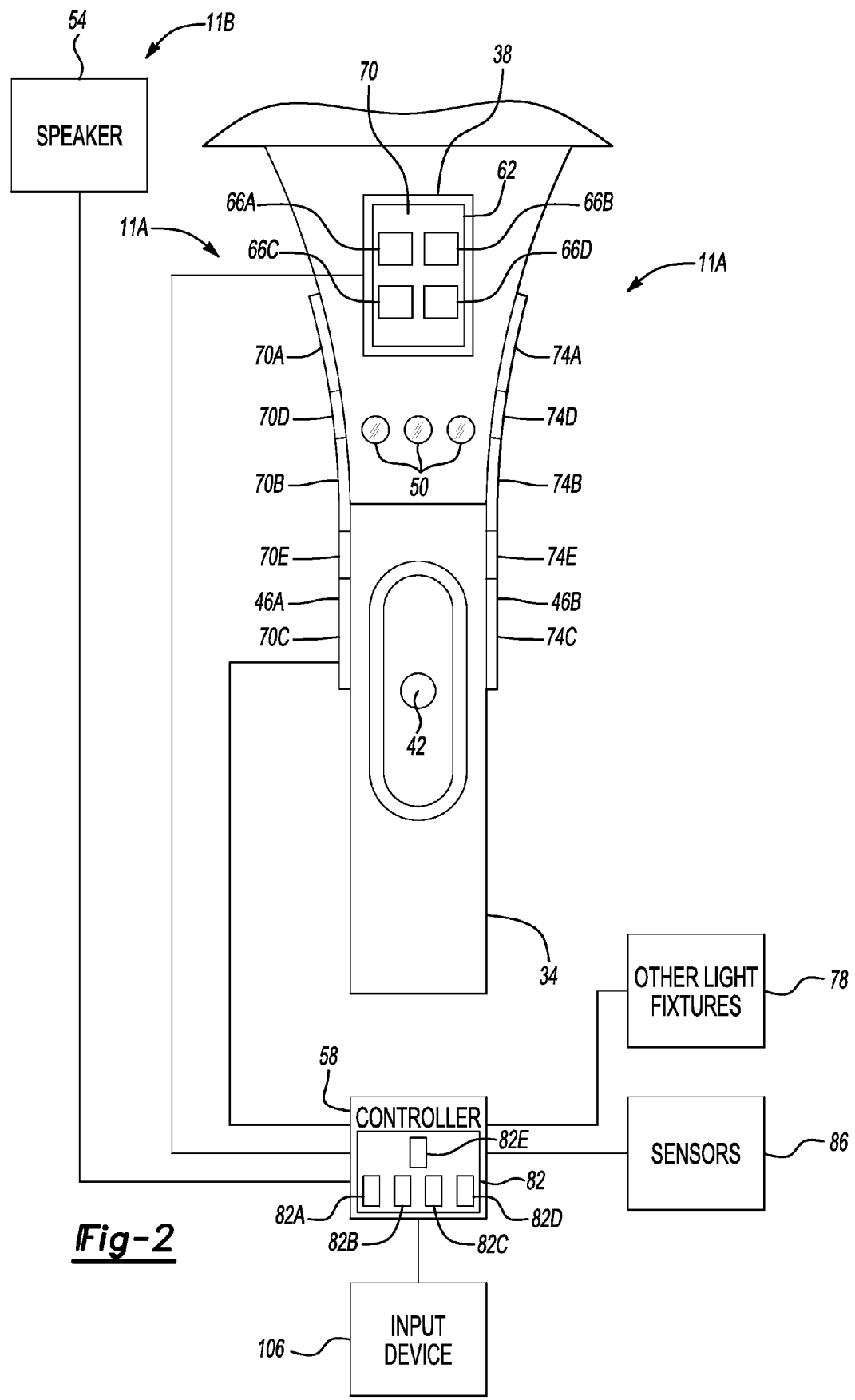
FIG. 2 is a schematic illustration of a customization system usable with the vehicle of FIG. 1.

The vehicle 10 includes a plurality of output devices 11, shown as the output devices 11A and 11B in FIG. 2, for emitting or transmitting a desired electromagnetic (EM) wave of a desired characteristic, such as wavelength, frequency, amplitude, etc., into the passenger compartment 18. The output devices 11 can include the output device 11B of FIG. 2, which is configured as an audio speaker 54 positioned adjacent to or on the console 34 or at any other suitable position or location within the passenger compartment 18. The speaker 54 is configured to selectively transmit an EM wave in the form of human-audible sound, i.e., sound waves having a frequency of approximately 20 to 20,000 Hertz (Hz).

The output devices 11 can also include the output devices 11A (see FIG. 2), such as light sources 46a and 46b each positioned on opposite sides of the console 34 and configured to selectively transmit an EM wave in the form of visible light, i.e., an EM wave having a wavelength of approximately 400 to 700 nanometers (nm). In an exemplary embodiment, the light sources 46A, 46B are configured as acrylic light pipes of the type known in the art, and therefore are configured for transmitting visible light from one or more RGB light-emitting diodes (LED). However, other embodiments of the light sources 46A, 46B may be used within the scope of the invention, such as electro-luminescent (EL) ribbon or another lighting source operable for transmitting a uniform and/or continuous lighting effect.

A plurality of LED indicators 50 are mounted with respect to the console 34 below the display 38. Each LED indicator 50 is configured to display information regarding the status of various systems of the vehicle 10. In an exemplary embodiment, one of the indicators 50 indicates the speed of a heating, ventilation, and air conditioning (HVAC) fan, while another indicator 50 indicates the desired or existing temperature on the passenger side 27 of the vehicle 10, and another indicator 50 indicates the desired or existing temperature of the driver side 28 of the vehicle 10. In addition to light, the indicators 50 may also or separately employ icons, symbols, alphanumeric characters, etc., in order to convey specific information about the various systems.

Referring to FIG. 2, an electronic control unit or controller 58 is operatively connected to each of the display 38, the light sources 46A, 46B, the indicators 50, and the speaker 54. The controller 58 can be configured as a general-purpose digital computer device generally comprising a microprocessor or a central processing unit, read-only memory (ROM), random access memory (RAM), electrically programmable read-only memory (EPROM), a high speed clock, analog-to-digital (A/D) and digital-to-analog (D/A) circuitry, and any input/output circuitry and devices (I/O) and/or appropriate signal conditioning and buffer circuitry of a known type. The controller 58 has a set of control algorithms (not shown) comprising resident program instructions and calibrations stored by or in the controller 58 and executed thereby to provide the functionality described below.

The display 38 functions as an interface between an occupant 24 (see FIG. 1) of the passenger compartment 18 and the controller 58. The display 38 also functions as an output device by displaying visual information provided or relayed from the controller 58. Likewise, the display 38 functions as an input device, as an occupant 24 of the passenger compartment 18 can input information into the controller 58 by touching a touch-screen portion 62 of the display 38, as will be understood by those of ordinary skill in the art.

The controller 58 is programmed and/or configured to control the display 38. During operation of the system 20 of FIG. 1, the controller 58 causes the display 38 to present a plurality of icons 66A-D on the screen portion 62. The icons 66A-D are shown against a "background" 70 on the screen portion 62. The icons 66A-D are distinguishable from the background 70 because the icons 66A-D are presented or displayed in a different color than that of the background 70. The icons 66A-D can be touched by an occupant 24 (see FIG. 1) of the passenger compartment 18 (see FIG. 1) in order to choose or select a particular vehicle function which the occupant 24 desired to control via the screen portion 62.

Still referring to FIG. 2, the controller 58 is configured to selectively control the output devices 11A and/or 11B, such as the light sources 46A, 46B and/or the speaker 54, respectively, to transmit a desired EM wave, i.e., visible light and audible sound, into the passenger compartment 18. More specifically, the controller 58 controls the color or colors which are transmitted by the light sources 46A, 46B and the sounds which are transmitted by the speaker 54. The controller 58 further controls the indicators 50, and more particularly controls the various colors or information transmitted by the indicators 50. In this manner, the controller 58 is able to provide customizable lighting and sound within the vehicle 10 of FIG. 1. That is, the controller 58 can selectively alter the colors transmitted from any or all of the screen portion 62, the light sources 46A, 46B, and the indicators 50 in response to a request or command which is transmitted via signals entered by the occupant 24 when touching the touch-screen portion of the display 38. Thus, the ambience of the passenger compartment 18 is readily customizable by an occupant 24 of FIG. 1 to suit his or her own tastes and preferences.

For example, within the scope of the invention predetermined themes or preset motifs may be quickly modified by an occupant 24 via the display 38. In one embodiment, when a first predetermined theme is selected, the controller 58 may cause the icons 66A-D, the segments 70A-C of the light source 46A, the segments 74A-C of the light source 46B, and indicators 50 to appear in a first shade, such as a particular shade of blue, and the background 70, segments 70D-E of the light source 46A, and segments 74D-E of the light source 46B to appear in a second shade, such as a complimentary shade of green. Likewise, when a second predetermined theme is selected, the controller 58 may cause the icons 66A-D, the segments 70A-C, the segments 74A-C, and the indicators 50 to appear in a third shade such as red, and the background 70, the segments 70D-E, and the segments 74D-E to appear in a fourth shade, such as a complimentary shade of blue. However, other shades and/or colors may be envisioned within the scope of the invention.

The controller 58 may also be configured to selectively change or modify the color and/or intensity of the light being transmitted from other light sources 78 on or within the vehicle 10, such as any light sources adjacent to an exterior door handle (not shown) or other exterior lighting configured to transmit light at or along the exterior of the vehicle 10 of FIG. 1, and/or any overhead lights inside the passenger compartment 18 of FIG. 1, etc. The other light sources 78 may be controlled in accordance with the predetermined themes described above.

The controller 58 is also configured to provide customizable sound, which can be associated with a particular vehicle condition using the display 38 as described below. The vehicle 10 includes a plurality of sensors 86, each being configured to monitor and/or detect at least one vehicle condition and to transmit signals indicative of the condition to the controller 58. The controller 58 stores in a data storage medium 82 a plurality of digital sound files 82A-E. The controller 58 is configured to cause the speaker 54 to transmit a particular sound or combination of sounds in accordance with a selected one of the digital sound files 82A-E whenever a sensor 86 indicates to the controller 58 that a particular predetermined vehicle condition is present. The controller 58 can also synchronize lighting and sound effects by selectively illuminating the light sources 78, 46A, and/or 46B in a particular color, such as flashing red, in conjunction with playing one of the digital sound files 82A-E being transmitted by the speaker 54, in order to further alert the occupant 24 to the presence of the vehicle condition.

Figure 3A:
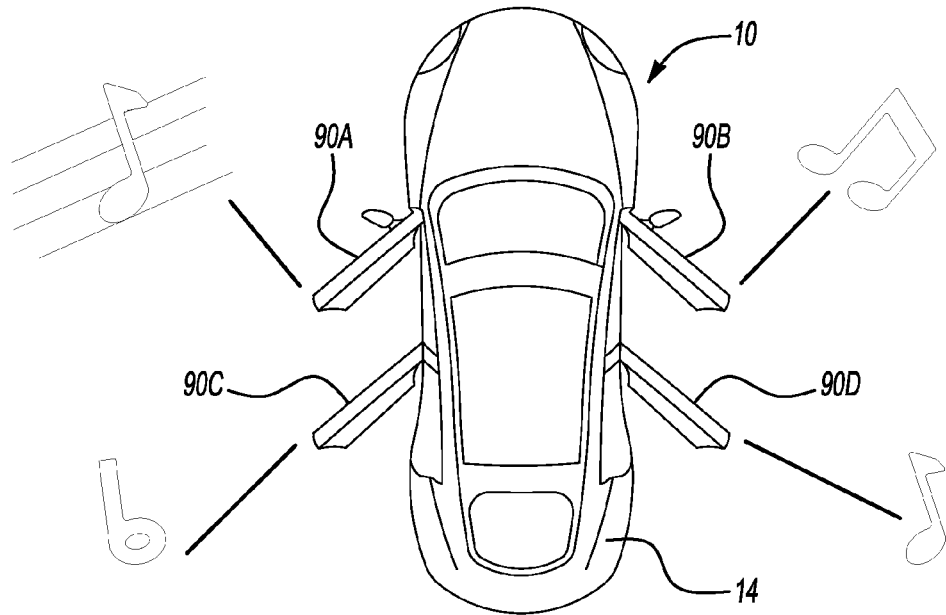
FIG. 3A is a schematic illustration of a first embodiment of the system of FIG. 2.

Referring to FIGS. 2 and 3A together, the controller 58 may be configured to cause the speaker 54 to generate EM waves in the form of sound waves in accordance with digital sound file 82B whenever the sensors 86 indicate that a first predetermined condition is present, such as one or more vehicle doors 90A-D being in an open or ajar position. For example, an occupant 24 can request that a digital file stating a recorded sentence such as "the door is ajar" or "close the door", or alternately play a sound effect such as the sound of rushing wind or a particular music clip to uniquely indicate that the door is open.

Figure 3B:
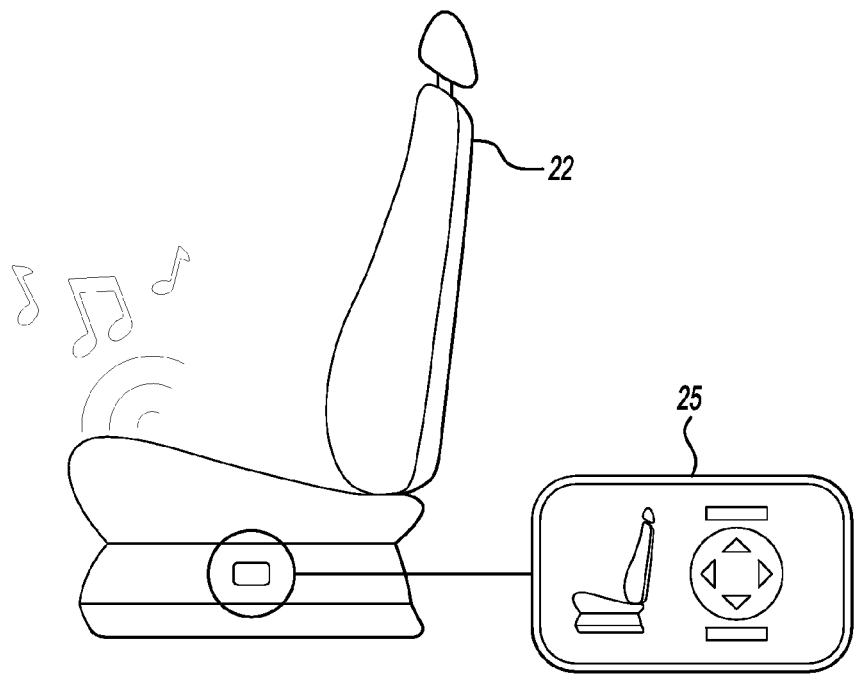
FIG. 3B is a schematic illustration of a second embodiment of the system of FIG. 2.

Referring to FIGS. 2 and 3B, the controller 58 may be configured to cause the speaker 54 to generate sound waves in accordance with digital sound file 82C when sensors indicate that a second predetermined condition is present, such as the position of one of the seats 22 is being adjusted, such as by using an adjustment panel 25. For example, an occupant 24 can request that a digital file stating a recorded sentence such as "seat is now moving forward", or alternately a sound effect or a particular music clip to uniquely indicate that the seat is being adjusted.

Figure 3C:
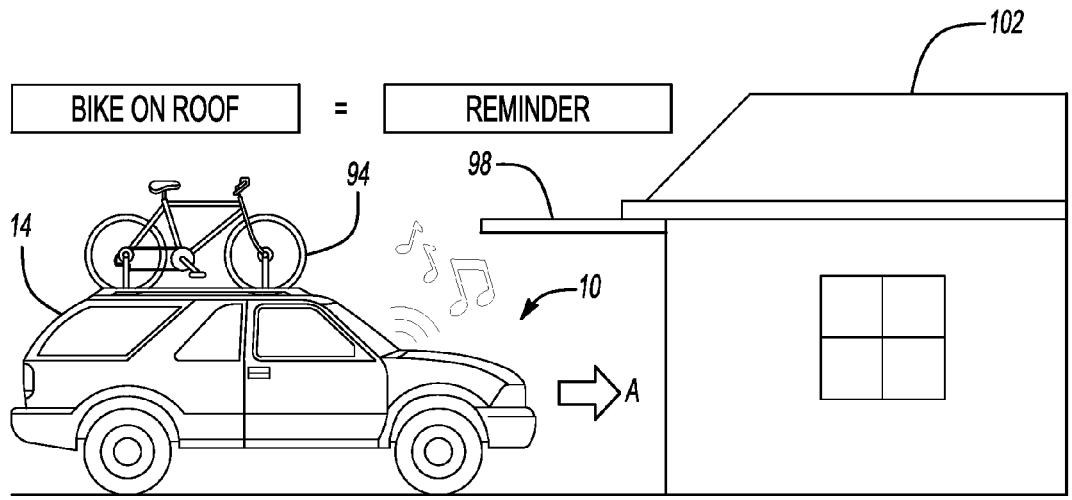
FIG. 3C is a schematic illustration of a third embodiment of the system of FIG. 2.

Referring to FIGS. 2 and 3C, the controller 58 may be configured to cause the speaker 54 to generate sound waves in accordance with digital sound file 82D when sensors indicate that a third predetermined condition is present, such as an object 94 positioned on the roof of the vehicle 10 is higher than an obstruction such as the door 98 of a garage 102. For example, the controller 58 might play a sound file of a recorded sentence stating "warning: object on roof", or a particular music clip or sound effect uniquely indicating an impending collision.

Figure 3D:
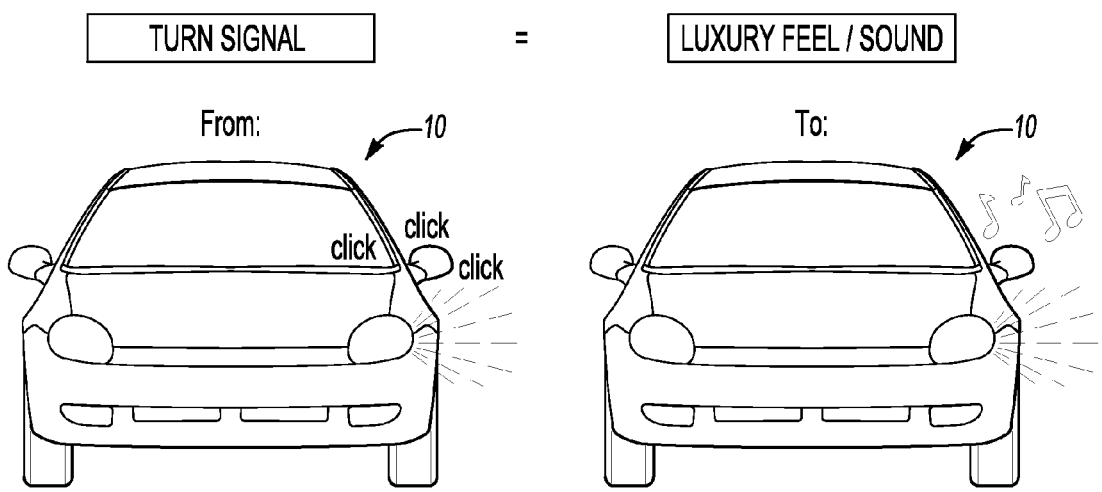
FIG. 3D is a schematic illustration of a fourth embodiment of the system of FIG. 2.

Referring to FIGS. 2 and 3D, the controller 58 may be configured to cause the speaker 54 to generate sound waves in accordance with digital sound file 82E when sensors indicate that a fourth predetermined condition is present, such as that a turn signal indicator is presently activated. For example, the controller 58 might play a recorded sentence stating "turning left", or a music clip or sound effect uniquely indicating such a maneuver, rather than the ubiquitous "clicking" sound transmitted by most turn signals. While FIGS. 3A-D present four possible embodiments, there are countless possible sound effects one could associate with any given vehicle system, and therefore the scope of the invention is not intended to be limited to the four exemplary embodiments of FIGS. 3A-D.

Referring again to FIG. 2, the controller 58 is configured such that a digital sound file associated with any one of the predetermined conditions exemplified in FIGS. 3A-D is selectively variable by an occupant 24 (see FIG. 1) via the touch-screen display 38. Thus, for example, an occupant 24 of FIG. 1 can request that the controller 58 reproduce the sound from any one of the stored files 82A-E for any of the predetermined vehicle conditions. Moreover, a data receiver 106 is operatively connected to the controller 58 to transmit data thereto, including any required or desired digital sound files. The data receiver 106 may be a telematics receiver, a cellular telephone receiver, a Universal Serial Bus (USB) port, etc. Accordingly, an occupant 24 (see FIG. 1) can transmit new digital sound files to the controller 58 and cause the controller 58 to reproduce the sound from one of the new files when one of the predetermined conditions exists.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body defining a passenger compartment;
a screen mounted with respect to the body inside the passenger compartment and configured to selectively display a plurality of colors;
a light source operable for transmitting light into the passenger compartment; and
a lighting customization system including a controller operatively connected to the display and the light source for controlling the color of the light and the color displayed by the screen;
wherein the lighting customization system is characterized by first and second selectable themes; wherein the controller causes the screen to display a first color and the light source to transmit light of a second color when the first theme is selected; and wherein the controller causes the screen to display a third color and the light source to transmit light of a fourth color when the second theme is selected.

2. The vehicle of claim 1,
wherein the controller is configured to cause the screen to display a plurality of icons and a background;
wherein the background is the first color when the first theme is selected; and
wherein the background is the third color when the second theme is selected.

3. The vehicle of claim 2, wherein the light source includes at least one of a light-emitting diode (LED) device and an electro-luminescent (EL) light ribbon.

4. The vehicle of claim 3, further comprising a center console mounted within the passenger compartment, wherein the light source is mounted to the center console.

* * * * *